(12) United States Patent
Zhu et al.

(10) Patent No.: US 12,015,135 B2
(45) Date of Patent: Jun. 18, 2024

(54) LITHIUM ION BATTERIES AND BATTERY MODULES

(71) Applicants: State Grid Jiangsu Electric Power Research Institute, Jiangsu (CN); Jiangsu Electric Power Research Institute Co., Ltd., Jiangsu (CN)

(72) Inventors: Hongbin Zhu, Jiangsu (CN); Xiaoqin Zhang, Jiangsu (CN); Xiang Yu, Jiangsu (CN)

(73) Assignees: State Grid Jiangsu Electric Power Research Institute (CN); Jiangsu Electric Power Research Institute Co., Ltd. (CN)

( * ) Notice: Subject to any disclaimer, the term of this patent is extended or adjusted under 35 U.S.C. 154(b) by 387 days.

(21) Appl. No.: 17/259,469

(22) PCT Filed: May 29, 2019

(86) PCT No.: PCT/CN2019/088968
§ 371 (c)(1),
(2) Date: Jan. 11, 2021

(87) PCT Pub. No.: WO2020/224016
PCT Pub. Date: Nov. 12, 2020

(65) Prior Publication Data
US 2022/0052393 A1 Feb. 17, 2022

(30) Foreign Application Priority Data
May 7, 2019 (CN) .......................... 201910373491.7

(51) Int. Cl.
*H01M 10/6556* (2014.01)
*H01M 10/0525* (2010.01)
(Continued)

(52) U.S. Cl.
CPC .... *H01M 10/6556* (2015.04); *H01M 10/0525* (2013.01); *H01M 10/486* (2013.01); *H01M 50/358* (2021.01); *H01M 50/383* (2021.01)

(58) Field of Classification Search
CPC .......... H01M 10/6556; H01M 50/358; H01M 50/383; H01M 50/143; H01M 10/486;
(Continued)

(56) References Cited

U.S. PATENT DOCUMENTS

2018/0323420 A1* 11/2018 Lee .................. H01M 50/609
2020/0251703 A1* 8/2020 Aldrich ............... H01M 50/375

* cited by examiner

*Primary Examiner* — Christopher P Domone

(57) ABSTRACT

Lithium ion batteries and battery modules are disclosed. The lithium ion battery includes a housing where a positive electrode, a negative electrode, and an electrolyte are provided. Some of the areas of the housing are made from the fusible material. When the temperature in the housing exceeds a set threshold, the area, made from the fusible material, on the housing is communicated, where the electrolyte flows out to separate from the positive electrode and the negative electrode. Timely separation of the electrolyte in the single lithium ion battery is achieved when the temperature thereof rises abnormally, the electrolyte is effectively protected from being ignited or decomposed, the single lithium ion battery is protected from being ignited and exploded, and damages to the rest surrounding single lithium ion batteries caused by a chain reaction brought by the single lithium ion battery of which the temperature rises abnormally are avoided.

9 Claims, 3 Drawing Sheets

(51) Int. Cl.
*H01M 10/48* (2006.01)
*H01M 50/358* (2021.01)
*H01M 50/383* (2021.01)

(58) Field of Classification Search
CPC ............. H01M 10/637; H01M 50/581; H01M 50/583; H01M 2200/10; H01M 2200/101; H01M 2200/103
See application file for complete search history.

LITHIUM ION BATTERIES AND BATTERY MODULES

FIELD

The present invention relates to the technical field of batteries, relates to novel lithium ion batteries and battery modules, and in particular, to lithium ion batteries of which electrolytes can be separated from electrodes, and flame retardant apparatuses.

BACKGROUND

An important characteristic of power generation, transmission, and consumption systems in electric power industry is the incapability of electrical energy storage; therefore, a large-scale energy storage system is introduced to keep the balance between an electric power load and power generation, so that the optimum economic efficiency is achieved in electrical grid operation. Due to the advantages such as high energy density and non-pollution, the lithium ion battery becomes a battery which is most widely used in the current electrical energy storage system. An electrolyte is taken as the blood of the lithium ion battery, and the thermostability of the electrolyte is a primary factor of restricting the safety performance of the lithium ion battery. Solvents used in the electrolyte are generally organic carbonate ester compounds which are high in activity and highly combustible and are equivalent to combustible materials. When the lithium ion battery is in a charging state, a positive electrode material is a compound having a strong oxidizing property, while a negative electrode material is a compound having a strong reducing property. In the case of overuse, the positive electrode material of strong zinc oxide has poor stability and oxygen is easily released, the carbonate ester reacts with oxygen, and lots of heat and gas are released, thereby further accelerating the decomposition of the positive electrode, and causing more exothermic reactions. Moreover, the activity of a negative electrode having a strong reducing property is similar to that of lithium metal, and the negative electrode having a strong reducing property contacts with oxygen to immediately burn and ignite the electrolyte, a diaphragm, etc. so as to cause the thermal runaway of the lithium ion battery, and burn and explode the lithium ion battery. Therefore, in order to avoid the occurrence of the thermal runaway to the lithium ion battery, the improvement of the safety and stability performance of the battery is of great importance to the use of large-scale energy storage batteries in an electric power system. In order to solve the problem in the prior art, mostly, the gas concentration, content and battery temperature inside the lithium ion battery are monitored, and fire extinguishing and cooling treatment is performed on the lithium ion battery, but the problem of the thermal runaway of the lithium ion battery cannot be solved from the source.

SUMMARY

With regard to the problem, the present invention provides a novel lithium ion battery and battery module, which can effectively avoid burning and explosion of a single battery and can avoid damages to surrounding other single batteries caused by a chain reaction brought by a single battery of which the temperature rises abnormally.

In order to achieve the technical objective above and achieve the technical effect above, the present invention is implemented by means of the following technical solutions.

According to a first aspect, the present invention provides a novel lithium ion battery, including a housing where a positive electrode, a negative electrode, and an electrolyte are provided. Some of the areas of the housing are made from the fusible material.

When the temperature in the housing exceeds a set threshold, the area, made from the fusible material, on the housing is communicated, where the electrolyte flows out to separate from the positive electrode and the negative electrode.

Preferably, some of the areas on both an upper portion and a lower portion of the housing are made from the fusible material.

When the temperature in the housing exceeds the set threshold, the area, made from the fusible material, on the upper portion of the housing is communicated to form a connecting channel where a flame retardant gas is introduced. The area, made from the fusible material, on the lower portion of the housing is communicated to form a release channel where the electrolyte flows out to separate from the positive electrode and the negative electrode.

Preferably, some of the areas on both the top and the bottom of the housing are made from the fusible material.

When the temperature in the housing exceeds the set threshold, the area, made from the fusible material, on the top of the housing is communicated to form a connecting channel where a flame retardant gas is introduced. The area, made from the fusible material, on the bottom of the housing is communicated to form a release channel where the electrolyte flows out to separate from the positive electrode and the negative electrode.

Preferably, the housing is divided into a first portion and a second portion which are provided vertically. A connecting area between the first portion and the second portion is made from the fusible material.

When the temperature in the housing exceeds the set threshold, the connecting area made from the fusible material is communicated, the second portion is separated from the first portion, and the electrolyte flows out to separate from the positive electrode and the negative electrode.

Preferably, all the side walls or some of the side walls of the housing are made from the fusible material.

When the temperature in the housing exceeds the set threshold, the areas of all the side walls or some of the side walls, made from the fusible material, on the housing are automatically cracked, and the electrolyte flows out to separate from the positive electrode and the negative electrode.

According to a second aspect, the present invention provides a novel lithium ion battery module, including:
a sealing box body filled with a flame retardant gas; and
a novel lithium ion battery provided in the sealing box body and including a housing where a positive electrode, a negative electrode, and an electrolyte are provided. A distance exists between the bottom of the novel lithium ion battery and that of the sealing box body. Some of the areas of the housing are made from the fusible material.

When the temperature in the housing exceeds a set threshold, the area, made from the fusible material, on the housing is communicated, where the electrolyte flows into the sealing box body to separate from the positive electrode and the negative electrode.

Preferably, some of the areas on both an upper portion and a lower portion of the housing are made from the fusible material.

When the temperature in the housing exceeds the set threshold, the area, made from the fusible material, on the upper portion of the housing is communicated to form a connecting channel. The area, made from the fusible material, on the lower portion of the housing is communicated to form a release channel.

The flame retardant gas enters an inner portion of the housing by means of the connecting channel.

The electrolyte flows from the release channel into the sealing box body to separate from the positive electrode and the negative electrode.

Preferably, some of the areas on both the top and the bottom of the housing are made from the fusible material.

When the temperature in the housing exceeds the set threshold, the area, made from the fusible material, on the top of the housing is communicated to form a connecting channel. The area, made from the fusible material, on the bottom of the housing is communicated to form a release channel.

The flame retardant gas enters an inner portion of the housing by means of the connecting channel.

The electrolyte flows from the release channel into the sealing box body to separate from the positive electrode and the negative electrode.

Preferably, the housing is divided into a first portion and a second portion which are provided vertically. A connecting area between the first portion and the second portion is made from the fusible material.

When the temperature in the housing exceeds the set threshold, the connecting area made from the fusible material is communicated, the second portion is separated from the first portion, and the second portion falls within the sealing box body.

The electrolyte flows into the sealing box body to separate from the positive electrode and the negative electrode.

Preferably, all the side walls or some of the side walls of the housing are made from the fusible material.

When the temperature in the housing exceeds the set threshold, the areas of all the side walls or some of the side walls, made from the fusible material, on the housing are automatically cracked and fall into the sealing box body, and the electrolyte flows into the sealing box body to separate from the positive electrode and the negative electrode.

Preferably, the novel lithium ion battery module further includes a gas circulation loop provided at an outer side of the sealing box body.

A first through hole and a second through hole are provided on the sealing box body.

Both ends of the gas circulation loop are respectively connected to the first through hole and the second through hole so as to circulate the flame retardant gas.

Preferably, a sensor is provided in the area, made from the fusible material, on the housing.

When it is detected that the area, made from the fusible material, on the housing is communicated, a starting signal is immediately sent to the gas circulation loop so as to start the gas circulation loop.

Preferably, the sensor is any one of a temperature sensor, a distance measuring sensor, and a speed measuring sensor.

Preferably, the gas circulation loop includes a first solenoid valve, a buffer tank, a heat exchanger, a second solenoid valve, and a compressor which are sequentially provided.

A valve port on the first solenoid valve distant from the buffer tank is connected to the first through hole, and a valve port on the compressor distant from the second solenoid valve is connected to the second through hole.

Preferably, the first through hole is provided on the upper portion of the sealing box body, and the second through hole is provided on the lower portion of the sealing box body.

Preferably, some of the areas on both an upper portion and a lower portion of the housing are made from the fusible material.

The first through hole and the second through hole are provided on the sealing box body, and the gas circulation loop is provided on an outer portion of the sealing box body. Both ends of the gas circulation loop are respectively connected to the first through hole and the second through hole.

An air supply member is further provided in the housing, is provided between the first through hole and the housing, and includes an air outlet corresponding to the area, made from the fusible material, on the upper portion of the housing.

When the temperature in the housing exceeds the set threshold, the area, made from the fusible material, on the upper portion of the housing is communicated to form a connecting channel, and the flame retardant gas enters an inner portion of the housing after passing through the air outlet and the connecting channel. The area, made from the fusible material, on the lower portion of the housing is communicated to form a release channel where the electrolyte flows into the sealing box body to separate from the positive electrode and the negative electrode.

Compared with the prior art, the beneficial effects of the present invention are as follows.

(1) According to the present invention, timely separation of the electrolyte in the lithium ion battery is ingeniously achieved when the temperature of a single lithium ion battery rises abnormally, the electrolyte is effectively protected from being ignited or decomposed, and the single lithium ion battery is protected from being ignited and exploded.

(2) According to the present invention, a gas circulation loop is introduced and set to be in a self-start mode, the temperature of the lithium ion battery can be restrained to rise too high, and the occurrence of the thermal runaway to the single lithium ion battery is prevented. Moreover, the temperature of surrounding lithium ion batteries is protected from rising abnormally due to the overtemperature of a certain single lithium ion battery, influences on the rest surrounding single lithium ion batteries are minimized, and the occurrence of the chain reaction to the lithium ion battery is prevented.

(3) According to the present invention, the sealing box body is always filled with a cooling flame retardant gas instead of air filled in the sealing box body in the prior art, the safety of the entire battery module can be effectively protected, and the occurrence of burning is avoided.

(4) By introducing a temperature-sensitive fusible material, a battery protection mode can be automatically started for the novel lithium ion battery proposed in the present invention without additionally consuming electrical energies, which is beneficial to the economy of energy storage of an energy storage battery.

DETAILED DESCRIPTION

Figure 1:
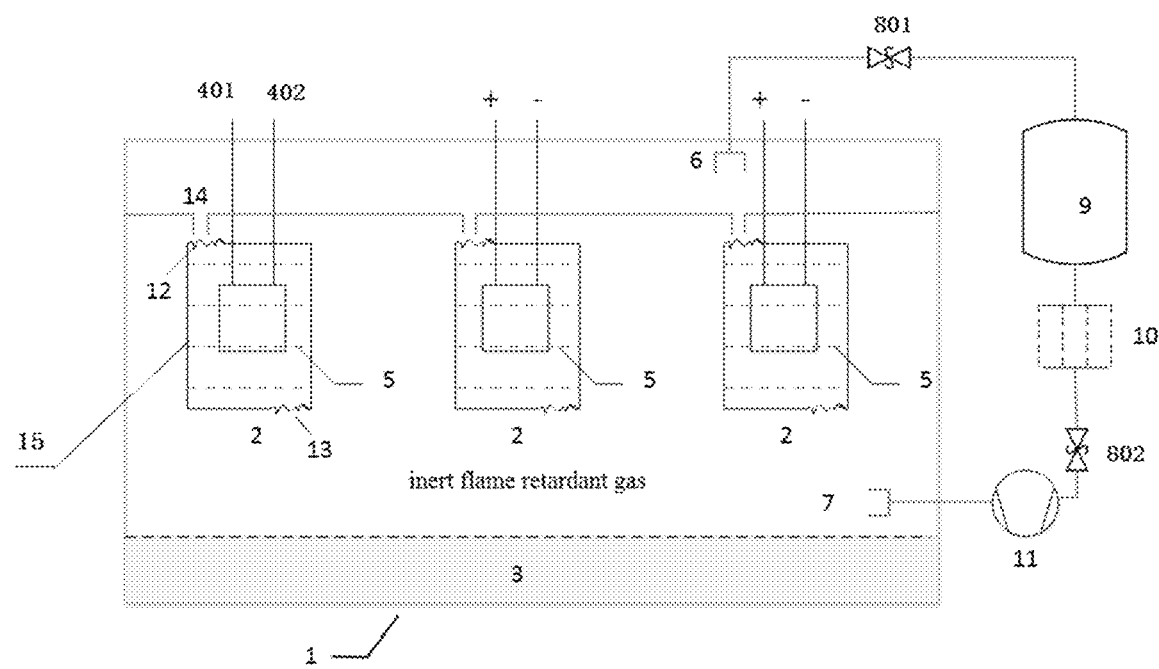
FIG. 1 is a schematic structural diagram of a novel lithium ion battery and battery module of one embodiment of the present invention.

To describe the purpose, the technical solutions and the advantages of the present invention more clearly, the present invention is further described in details below with reference to the embodiments. It should be understood that the specific embodiments described herein are merely used for explaining the present invention, rather than defining the scope of protection of the present invention.

The principle of application of the present invention is described in details below with reference to the accompanying drawings.

In the prior art, in order to avoid the occurrence of the thermal runaway to the lithium ion battery, the improvement of the safety and stability performance of the battery is of great importance to the use of large-scale energy storage batteries in an electric power system. Mostly, the gas concentration and content, the battery temperature, etc. inside the lithium ion battery are monitored, and fire extinguishing and cooling treatment is performed on the lithium ion battery. Hence, the methods cannot solve the problem of the thermal runaway of the lithium ion battery from the source. With this regard, the present invention provides a novel lithium ion battery and battery module, which achieve timely separation of the electrolyte in the novel single lithium ion battery when the temperature thereof rises abnormally, effectively protect the electrolyte from being ignited or decomposed, protect the novel single lithium ion battery from being ignited and exploded, and avoid damages to the rest surrounding novel single lithium ion batteries caused by a chain reaction brought by the novel single lithium ion battery of which the temperature rises abnormally. It is of innovative significance to ensure the safe and stable operation of the energy storage battery. Once the novel lithium ion battery and the battery module are put on the market, the application prospects are inestimable.

Embodiment 1

Embodiments of the present invention provide a novel lithium ion battery, including a housing 15 where a positive electrode 401, a negative electrode 402, and an electrolyte 5 are provided. Some of the areas of the housing 15 are made from the fusible material. The prior art is applied in the design principles of the positive electrode 401, the negative electrode 402, and the electrolyte 5. Therefore, more details are not described in the present invention. Both the positive electrode 401 and the negative electrode 402 are connected to a top wall of the housing 15.

When the temperature in the housing 15 exceeds a set threshold, the area, made from the fusible material, on the housing 15 is communicated (penetrated), where the electrolyte 5 flows out to totally separate from the positive electrode 401 and the negative electrode 402. Under the isolation of a cooling flame retardant gas, the electrolyte 5 is not decomposed to produce $H_2$, and is not ignited due to the over-temperature so as to effectively protect the electrolyte 5 from being ignited or decomposed, and protect a single battery from being ignited and exploded. The set threshold is set according to actual conditions, and no more limitation is made in the present invention. It can be understood that a part of the housing is made from fusible material; and when a temperature in the housing exceeds a set threshold, the part made from the fusible material of the housing is penetrated, where electrolyte flows out to separate from the positive electrode and the negative electrode.

In one specific implementation of the embodiments of the present invention, as shown in FIG. 1, some of the areas on both an upper portion and a lower portion of the housing 15 are made from the fusible material. Preferably, some of the areas on both the top and the bottom of the housing 15 are made from the fusible material. The fusible material is a temperature-sensitive fusible material, and can be directly purchased from the market. Because the structure and composition of the fusible material are not innovative in the present invention, no limitation is made to the specific structure and composition thereof. A temperature-sensitive fusible material that is able to melt automatically as long as the temperature sensed by the temperature-sensitive fusible material exceeds the set threshold (i.e., when the temperature of the novel lithium ion battery rises abnormally) can be applicable to the novel lithium ion battery in the embodiments of the present invention.

When the temperature in the housing 15 is within a normal range, the areas, made from the fusible material, of the upper portion and the lower portion of the housing 15 and the remaining portion on the housing 15 together form a closed space. When the temperature in the housing 15 exceeds the set threshold, the area, made from the fusible material, on the upper portion of the housing 15 is communicated (i.e., the material is automatically melt) to form a connecting channel 12 where a flame retardant gas is introduced. The area, made from the fusible material, on the lower portion of the housing 15 is communicated (i.e., the material is automatically melt) to form a release channel 13 where the electrolyte 5 flows out to separate from the positive electrode and the negative electrode.

Figure 2:
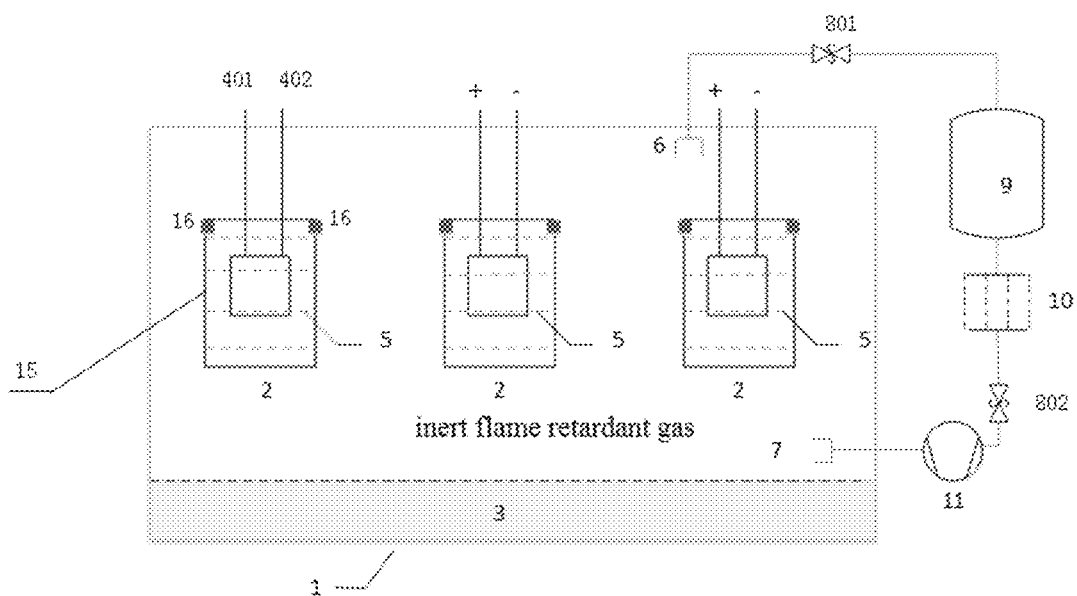
FIG. 2 is a schematic structural diagram of a novel lithium ion battery and battery module of another embodiment of the present invention.

In another specific implementation of the embodiments of the present invention, as shown in FIG. 2, the housing 15 is divided into a first portion and a second portion which are provided vertically. A connecting area 16 between the first portion and the second portion is made from the fusible material. Preferably, as shown in FIG. 2, the first portion is a top wall of the housing 15, and the second portion is a portion formed by side walls of the housing 15 and a bottom wall thereof.

When the temperature in the housing 15 is within the normal range, the connecting area 16, made from the fusible material, of the upper portion of the housing 15 and the first portion and the second portion together form a closed space. When the temperature in the housing 15 exceeds the set threshold (i.e., when the temperature of the novel lithium ion battery rises abnormally), the connecting area 16 made from the fusible material is communicated (i.e., the material is automatically melt), the second portion is separated from the first portion, and the electrolyte 5 flows out to separate from the positive electrode and the negative electrode.

Figure 3:
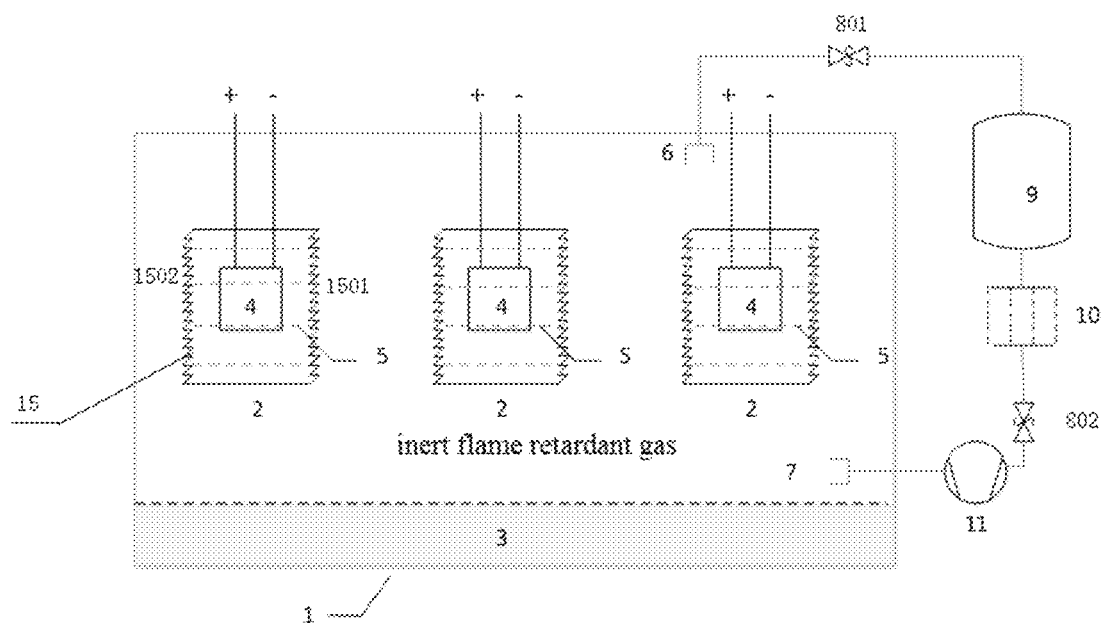
FIG. 3 is a schematic structural diagram of a novel lithium ion battery and battery module of a third embodiment of the present invention.

In a third specific implementation of the embodiments of the present invention, as shown in FIG. 3, all the side walls or some of the side walls of the housing 15 are made from the fusible material.

When the temperature in the housing 15 is within the normal range, all the side walls (1501, 1502) or some of the side walls, made from the fusible material, of the upper portion of the housing 15 and the remaining portion on the housing 15 together form a closed space. When the temperature in the housing 15 exceeds the set threshold (i.e., when the temperature of the novel lithium ion battery rises abnormally), the areas of all the side walls (1501, 1502) or some of the side walls, made from the fusible material, on the housing 15 are automatically cracked, and the electrolyte 5 flows out to separate from the positive electrode and the negative electrode.

Embodiment 2

On the basis of the same inventive concept as that of embodiment 1, the embodiments of the present invention provide a novel lithium ion battery module, including:

a sealing box body 1 filled with a flame retardant gas; and a novel lithium ion battery 2 provided in the sealing box body 1 and including a housing 15 where a positive electrode 401, a negative electrode 402, and an electrolyte 5 are provided. A distance exists between the bottom of the novel lithium ion battery and that of the sealing box body 1 and is used as an electrolyte storage area 3 for storing the electrolyte 5 flowing out of the housing 15. The distance between the bottom of the novel lithium ion battery 2 and that of the sealing box body 1 needs to ensure that the electrolyte 5 flowing out of the housing 15 is required to be totally separated from the positive electrode 401 and the negative electrode 402. Some of the areas of the housing 15 are made from the fusible material. No specific limitation is made to the number of novel lithium ion batteries, and no specific limitation is made to the specific arrangement of the novel lithium ion batteries as long as distances exist between bottoms of the novel lithium ion batteries 2 and those of the sealing box body 1. During specific implementation, the novel lithium ion battery 2 can be mounted in the sealing box body 1 by using a support. Both the positive electrode 401 and the negative electrode 402 are connected to a top wall of the housing 15. It can be understood that a part of the housing are made from fusible material; and when a temperature in the housing exceeds a set threshold, the part made from the fusible material of the housing is penetrated, where electrolyte flows out to separate from the positive electrode and the negative electrode.

When the temperature in the housing 15 exceeds the set threshold (i.e., when the temperature of the novel lithium ion battery rises abnormally), the area, made from the fusible material, on the housing 15 is communicated (i.e., the material is automatically melt), where the electrolyte 5 flows into the sealing box body 1, i.e., into the electrolyte storage area 3, to separate from the positive electrode and the negative electrode.

In one specific implementation of the embodiments of the present invention, as shown in FIG. 1, some of the areas on both an upper portion and a lower portion of the housing 15 are made from the fusible material. Preferably, some of the areas on both the top and the bottom of the housing 15 are made from the fusible material.

The areas, made from the fusible material, of the upper portion and the lower portion of the housing 15 and the remaining portion on the housing 15 together form a closed space. When the temperature in the housing 15 exceeds the set threshold, the area, made from the fusible material, on the upper portion of the housing 15 is communicated to form a connecting channel 12. The area, made from the fusible material, on the lower portion of the housing 15 is communicated to form a release channel 13.

The flame retardant gas enters an inner portion of the housing 15 by means of the connecting channel 12 so as to further achieve inflaming retarding.

The electrolyte 5 flows from the release channel 13 into the sealing box body 1 to separate from the positive electrode and the negative electrode.

In one specific implementation of the embodiments of the present invention, as shown in FIG. 2, the housing 15 is divided into a first portion and a second portion which are provided vertically. A connecting area 16 between the first portion and the second portion is made from the fusible material. Preferably, as shown in FIG. 2, the first portion is a top wall of the housing, and the second portion is a portion formed by side walls (1501, 1502) of the housing and a bottom wall of the housing.

When the temperature in the housing 15 is within the normal range, the connecting area 16, made from the fusible material, of the upper portion of the housing 15 and the first portion and the second portion together form a closed space. When the temperature in the housing 15 exceeds the set threshold, the connecting area 16 made from the fusible material is communicated, the second portion is separated from the first portion, and the second portion falls into the sealing box body 1.

The electrolyte 5 flows into the sealing box body 1 to separate from the positive electrode and the negative electrode.

In one specific implementation of the embodiments of the present invention, as shown in FIG. 3, all the side walls (1501, 1502) or some of the side walls of the housing 15 are made from the fusible material.

When the temperature in the housing 15 is within the normal range, all the side walls (1501, 1502) or some of the side walls, made from the fusible material, of the upper portion of the housing 15 and the remaining portion on the housing 15 together form a closed space. When the temperature in the housing 15 exceeds the set threshold, the areas of all the side walls or some of the side walls, made from the fusible material, on the housing 15 are automatically cracked and fall into the sealing box body 1, and the electrolyte 5 flows into the sealing box body 1 to separate from the positive electrode and the negative electrode.

Embodiment 3

On the basis of embodiment 2, the differences between the embodiments of the present invention and embodiment 2 are that:

in order to keep the flame retardant gas circulate in the sealing box body 1 so as to better reduce the temperature in the novel lithium ion battery and the sealing box body 1, the novel lithium ion battery module further includes a gas circulation loop provided at an outer side of the sealing box body 1.

A first through hole 6 and a second through hole 7 are provided on the sealing box body 1. Preferably, the first through hole 6 is provided on an upper portion of the sealing box body 1, and the second through hole 7 is provided on a lower portion of the sealing box body 1.

Both ends of the gas circulation loop are respectively connected to the first through hole 6 and the second through hole 7 so as to circulate the flame retardant gas. In one specific implementation of the embodiments of the present invention, the gas circulation loop includes a first solenoid valve 801, a buffer tank 9, a heat exchanger 10, a second solenoid valve 802, and a compressor 11 which are sequentially provided. A valve port on the first solenoid valve 801 distant from the buffer tank 9 is connected to the first through hole 6, and a valve port on the compressor 11 distant from the second solenoid valve 802 is connected to the second through hole 7. In other implementations of the embodiments of the present invention, the gas circulation loop may be of other structures where the flame retardant gas in a sealing gas can be circulated and cooled.

In preferred implementations of the embodiments of the present invention, a sensor is provided in the area, made from the fusible material, on the housing 15. When the sensor detects that the area made from the fusible material is communicated, a starting signal is sent to the gas circulation loop so as to start the gas circulation loop to spontaneously circulate the flame retardant gas. In practical application, the sensor may be a temperature sensor, a distance measuring sensor, or a speed measuring sensor.

In conclusion, a specific operation process of a flame retardant apparatus in the embodiments of the present invention includes:

When the temperature inside a certain novel lithium ion battery in a module rises to a temperature T, the area, made from the temperature-sensitive fusible material, on the housing 15 of the novel lithium ion battery melts or cracks, so that the electrolyte 5 is totally separated from the positive electrode and the negative electrode. Moreover, the sensor provided on the fusible material sends a triggering signal to the gas circulation loop. The flame retardant gas in the buffer tank 9 enters the sealing box body 1 by means of a pipeline and the first through hole 6 on the sealing box body 1, flows out of the sealing box body 1 by means of the second through hole 7 on the sealing box body 1, and enters the compressor 11 for compressing. The compressed flame retardant gas enters the heat exchanger 10 for cooling, and then is conveyed to the buffer tank 9. The next round of circulation is started and kept repeating. The novel lithium ion battery of which the temperature rises abnormally is gradually cooled by the gas circulation loop, and therefore, when the temperature decreases to a normal operating temperature interval of the novel lithium ion battery, a closing signal is sent to the gas circulation loop for closing the first solenoid valve 801, the second solenoid valve 802, the heat exchanger 10, and the compressor 11 in the gas circulation loop.

Embodiment 4

On the basis of embodiment 2, the differences between the embodiments of the present invention and embodiment 2 are that:

some of the areas on both an upper portion and a lower portion of the housing 15 are made from the fusible material. Preferably, some of the areas on both the top and the bottom of the housing 15 are made from the fusible material.

The first through hole 6 and the second through hole 7 are provided on the sealing box body 1, and the gas circulation loop is provided on an outer portion of the sealing box body 1. Both ends of the gas circulation loop are respectively connected to the first through hole 6 and the second through hole 7.

An air supply member is further provided in the housing 15, is provided between the first through hole 6 and the housing 15, and includes an air outlet 14 corresponding to the area, made from the fusible material, on the upper portion of the housing 15 for forcing the flame retardant gas to enter from the connecting channel 12 of the lithium ion battery into the housing 15. Moreover, the electrolyte flows out of the release channel 13. In this way, the lithium ion battery can fully participate in the gas circulation loop so as to effectively achieve cooling and inflaming retarding of the lithium ion battery.

When the temperature in the housing 15 exceeds the set threshold, the area, made from the fusible material, on the upper portion of the housing 15 is communicated to form the connecting channel 12, and the flame retardant gas enters an inner portion of the housing 15 after passing through the air outlet 14 and the connecting channel 12. The area, made from the fusible material, on the lower portion of the housing 15 is communicated to form the release channel 13 where the electrolyte 5 flows from the release channel 13 into the sealing box body 1 to separate from the positive electrode and the negative electrode.

In conclusion:

(1) According to the present invention, timely separation of the electrolyte in the lithium ion battery is ingeniously achieved when the temperature of a single lithium ion battery rises abnormally, the electrolyte is effectively protected from being ignited or decomposed, and the single lithium ion battery is protected from being ignited and exploded.

(2) According to the present invention, a gas circulation loop is introduced and set to be in a self-start mode, the temperature of the lithium ion battery can be restrained to rise too high, and the occurrence of the thermal runaway to the single lithium ion battery is prevented. Moreover, the temperature of surrounding lithium ion batteries is protected from rising abnormally due to the overtemperature of a certain single lithium ion battery, influences on the rest surrounding single lithium ion batteries are minimized, and the occurrence of the chain reaction to the lithium ion battery is prevented.

(3) According to the present invention, the sealing box body is always filled with a cooling flame retardant gas instead of air filled in the sealing box body in the prior art, the safety of the entire battery module can be effectively protected, and the occurrence of burning is avoided.

(4) By introducing a temperature-sensitive fusible material, a battery protection mode can be automatically started for the novel lithium ion battery proposed in the present invention without additionally consuming electrical energies, which is beneficial to the economy of energy storage of an energy storage battery.

The basic principles, major features and advantages of the present invention are displayed and described above. Those skilled in the art should understand that the present invention is not limited by the embodiments above, the descriptions in the embodiments and the specification only explain the principle of the present invention, variations and improvements are further made in the present invention without departing from the spirit and scope of the present invention, and these variations and improvements fall within the scopes of protection of the present invention. The scopes of protection of the present invention are defined by the attached claims and equivalents thereof.

What is claimed is:

1. A lithium ion battery module, comprising:
a sealing box body filled with a flame retardant gas; and
a lithium ion battery provided in the sealing box body, which comprises a housing in which a positive electrode, a negative electrode, and an electrolyte are provided, wherein a distance exists between a bottom of the lithium ion battery and a bottom of the sealing box body,
wherein, a part on an upper portion of the housing and a part on a lower portion of the housing are made from the fusible material;

when the temperature in the housing exceeds the set threshold, the part made from the fusible material on the upper portion of the housing is penetrated to form a connecting channel where a flame retardant gas is introduced, and the part made from the fusible material on the lower portion of the housing is penetrated to form a release channel where the electrolyte flows out to separate from the positive electrode and the negative electrode.

2. The lithium ion battery module according to claim 1, wherein, a part on a top of the housing and a part on a bottom of the housing are made from the fusible material;

when the temperature in the housing exceeds the set threshold, the part made from the fusible material on the top of the housing is penetrated to form a connecting channel where a flame retardant gas is introduced, and the part made from the fusible material on the bottom of the housing is penetrated to form a release channel where the electrolyte flows out to separate from the positive electrode and the negative electrode.

3. The lithium ion battery module according to claim 1, wherein, the housing is divided into a first section and a second section which are provided vertically, a connecting area between the first section and the second section is made from the fusible material;

when the temperature in the housing exceeds the set threshold, the connecting area made from the fusible material is penetrated, the second section is separated from the first section and falls into the sealing box body, and the electrolyte flows into the sealing box body to separate from the positive electrode and the negative electrode.

4. The lithium ion battery module according to claim 1, wherein, entire side walls or a part of side walls of the housing are made from the fusible material; and when the temperature in the housing exceeds the set threshold, the entire side walls or the part of the side walls made from the fusible material on the housing automatically crack and falls into the sealing box body, and the electrolyte flows into the sealing box body to separate from the positive electrode and the negative electrode.

5. The lithium ion battery module according to claim 1, wherein, wherein the lithium ion battery module further comprises a gas circulation loop provided at an outer side of the sealing box body;

a first through hole and a second through hole are provided on the sealing box body, and both ends of the gas circulation loop are respectively connected to the first through hole and the second through hole so as to circulate the flame retardant gas;

a sensor is provided in the part made from the fusible material on the housing:

when it is detected that the part made from the fusible material on the housing is penetrated, a starting signal is immediately sent to the gas circulation loop so as to start the gas circulation loop.

6. The lithium ion battery module according to claim 5, wherein, the sensor is a temperature sensor, a distance measuring sensor, or a speed measuring sensor.

7. The lithium ion battery module according to claim 5, wherein, the gas circulation loop comprises a first solenoid valve, a buffer tank, a heat exchanger, a second solenoid valve, and a compressor which are sequentially provided;

a valve port on the first solenoid valve distant from the buffer tank is connected to the first through hole; and a valve port on the compressor distant from the second solenoid valve is connected to the second through hole.

8. The lithium ion battery module according to claim 5, wherein, the first through hole is provided on an upper portion of the sealing box body, and the second through hole is provided on a lower portion of the sealing box body.

9. The lithium ion battery module according to claim 1, wherein, a part of an upper portion of the housing and a part of a lower portion of the housing are made from the fusible material;

a first through hole and a second through hole are provided on the sealing box body, and a gas circulation loop is provided on an outer portion of the sealing box body; both ends of the gas circulation loop are respectively connected to the first through hole and the second through hole;

an air supply member is further provided in the housing, is provided between the first through hole and the housing, and comprises an air outlet corresponding to the part made from the fusible material on the upper portion of the housing;

when the temperature in the housing exceeds the set threshold, the part made from the fusible material on the upper portion of the housing is penetrated to form a connecting channel, and the flame retardant gas enters an inner portion of the housing after passing through the air outlet and the connecting channel; and the part made from the fusible material on the lower portion of the housing is penetrated to form a release channel where the electrolyte flows into the sealing box body to separate from the positive electrode and the negative electrode.

* * * * *